(12) United States Patent
Kliem

(10) Patent No.: US 8,783,881 B2
(45) Date of Patent: Jul. 22, 2014

(54) DISPLAY IN THE MIRROR GLASS AND PROCESS FOR PRODUCTION

(75) Inventor: Andreas Kliem, Schorndorf (DE)

(73) Assignee: SMR Patents S.a.r.l., Luxembourg (LU)

( * ) Notice: Subject to any disclaimer, the term of this patent is extended or adjusted under 35 U.S.C. 154(b) by 363 days.

(21) Appl. No.: 13/181,648

(22) Filed: Jul. 13, 2011

(65) Prior Publication Data

US 2012/0014005 A1     Jan. 19, 2012

(30) Foreign Application Priority Data

Jul. 13, 2010   (DE) .......................... 10 2010 032 026

(51) Int. Cl.
| | |
|---|---|
| *G02B 5/08* | (2006.01) |
| *B60R 1/06* | (2006.01) |
| *B60Q 1/26* | (2006.01) |
| *B60R 1/12* | (2006.01) |

(52) U.S. Cl.
CPC ............... *B60Q 1/2665* (2013.01); *B60R 1/06* (2013.01); *B60R 1/1207* (2013.01); *B60R 2001/1215* (2013.01)
USPC .......................................... 359/843; 701/49

(58) Field of Classification Search
CPC ............ B60R 1/025; B60R 1/02; B60R 1/07; B60N 2/0244
USPC ..................... 359/839, 841, 871–877; 701/49
See application file for complete search history.

(56) References Cited

U.S. PATENT DOCUMENTS

| | | | |
|---|---|---|---|
| 6,076,948 | A | 6/2000 | Bukosky et al. |
| 7,327,321 | B2 | 2/2008 | Todd et al. |
| 7,717,596 | B1 | 5/2010 | Bell |
| 8,254,011 | B2 * | 8/2012 | Baur et al. ..................... 359/267 |
| 2007/0058257 | A1 | 3/2007 | Lynam |
| 2010/0126030 | A1 * | 5/2010 | Weller et al. ..................... 33/354 |

FOREIGN PATENT DOCUMENTS

| | | |
|---|---|---|
| DE | 29921059 | 3/2000 |
| DE | 20218383 | 2/2003 |
| EP | 1022190 | 7/2000 |
| EP | 2042373 | 4/2009 |
| WO | 00/30893 | 6/2000 |

OTHER PUBLICATIONS

German Search Report for application No. 10 2010 032 026.9-31 dated May 12, 2011 and a machine translation thereof.

* cited by examiner

*Primary Examiner* — Jennifer L Doak
(74) *Attorney, Agent, or Firm* — Reising Ethington PC

(57) ABSTRACT

A display in the mirror glass is proposed, which is established in a simple way by a light module and a structured mirror surface. A process is employed that engraves the icon, which is to be shown, into the glass mirror layer with a laser beam.

10 Claims, 2 Drawing Sheets

DISPLAY IN THE MIRROR GLASS AND PROCESS FOR PRODUCTION

The invention is based on a priority patent application DE 10 2010 032 026.9 which is hereby incorporated by reference.

BACKGROUND ART

1. Field of the Invention

The invention relates to a display in a motor vehicle, which is positioned in an exterior mirror.

2. Description of the Related Art

The invention also concerns the production of a display of this type.

Displays serve a variety of functions in automotive engineering, for example, warning lights. An example of a function of this type is a blind spot detection system. By means of sensors, for example, optical sensors, ultrasound or radar sensors, road users in the blind spot region are detected by this detection system, and in the case of road users being detected in this region, a warning light in activated, which is mounted in the interior, in the region of the exterior mirror on the A-pillar of the vehicle, or is situated behind the mirror glass of an exterior mirror.

Other functions, which displays serve, are parking assistance, for example, or similar, in which the distance to a rearward vehicle is visualised and/or a warning lamp is activated, if the distance falls below a minimal value.

Due to their function, displays of this type are to be designed in such a way that they are not overlooked by the driver in the respective situation. However, this could be the case in a blind spot detection system with the warning light attached in the region of the A-pillar, or in parking assistance with displays in the region of the instrument cluster of the vehicle.

A variety of displays of this type behind the mirror glass are known in the prior art. In the process, dichroic mirrors or semitransparent mirrors are preferably used.

It is known from EP 2042373 to arrange an LED behind a semitransparent mirror. The light of the LED is conducted through the transparent mirror layer and is seen by the driver as a warning display. The form of the warning icon is produced by a mask, which is introduced into a masking layer.

The disadvantage is the complex design of the mirror with the lighting and the use of a semitransparent mirror.

SUMMARY OF THE INVENTION

The main advantage of the display is that no visible components are required for the display, as well as fewer special components, such as semitransparent mirror glasses, for example. In this way, impermeable mirror glasses can still be implemented.

It is also advantageous that heating foils for de-icing the mirror in winter can still be used. It is equally advantageous that no extensive modifications are necessary to the mirror housing, especially in the case of display elements being attached to the mirror glass of a mirror from behind. Additionally, a display with higher light intensity with low energy use can thus be realised, without dazzling the driver.

The type of display in connection with a blind spot warning system is particularly advantageous, since when changing lanes, even in present warning systems, it is still required that the driver looks in the exterior mirror, in order to detect vehicles which are further away, and, if necessary, to refrain from changing lanes. In this application, the display is therefore effected in the direct field of view of the driver during an intended lane change.

The luminous elements are particularly easily applied to the mirror by means of adhesives. Advantageously, bright light-emitting diodes are used here, which have a particularly cost-effective implementation with high light intensity. It is particularly advantageous to use several luminous elements, which are installed in the exterior region of the mirror, on an exterior mirror, preferably on a side of the exterior mirror turned away from the vehicle. A particularly effective display with a particularly high warning effect for the driver is thus achieved, which, at the same time, is not in the regular field of view of the driver.

In other applications, for example, in parking assistance, in which the light-emitting diodes could be applied in the interior rear view mirror and/or in the exterior mirror, corresponding advantages are shown. Further features of the invention result from the subsequent description of execution examples, or from the dependent claims.

BRIEF DESCRIPTION OF THE DRAWINGS

The invention is subsequently explained in more detail by means of the embodiments shown in the drawings.

DETAILED DESCRIPTION OF THE DRAWINGS

Figure 1:
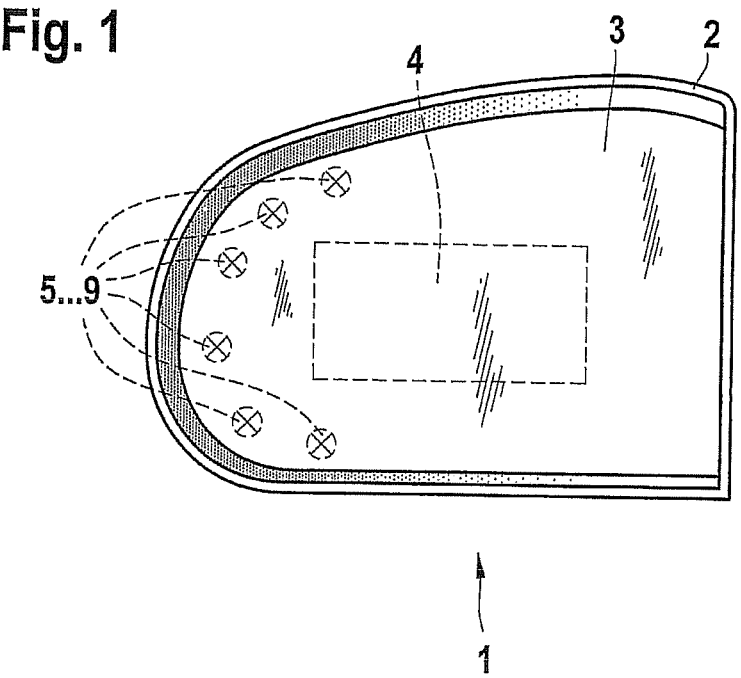
FIGS. 1 and 2 here show a top view and an exploded drawing of an exterior mirror of a motor vehicle, in which luminous elements are installed on the mirror glass.

FIG. 1 shows an exterior mirror 1, which includes a mirror housing 2, a mirror glass 3, an actuator for adjusting the mirror, as well as luminous elements 5 to 9. In the execution example shown, the luminous elements are installed, preferably stuck, on the mirror glass from behind, i.e. on the side of the glass not visible to the driver. These luminous elements are controlled for warning the driver in certain situations, this being the case when a road user is detected in the blind spot of the vehicle, in the preferred execution example of a blind spot detection system. In this case, the luminous elements are lit, whereby the driver is made aware of the danger by the illumination of the mirror.

In the preferred execution example, the luminous elements are installed in the exterior region of the exterior mirror on the side facing away from the vehicle.

In other designs, it has been shown that it is suitable, additionally or alternatively, to provide other regions of the exterior mirror with luminous elements, possibly even in different colours. Through this, another different display example is shown with equal distribution over the mirror glass surface. With the equal distribution, for example, illumination along the whole edge of the mirror housing is achieved. Different information can thus be conveyed with the use of different colours.

In the preferred execution example, the luminous elements 5 to 9 show bright light-emitting diodes, which are placed with their cables in a housing from behind, and are stuck to the mirror glass.

Light modules of this type, which are stuck to the semitransparent mirror glass from behind, are also known in U.S. Pat. No. 7,327,321.

Figure 2:
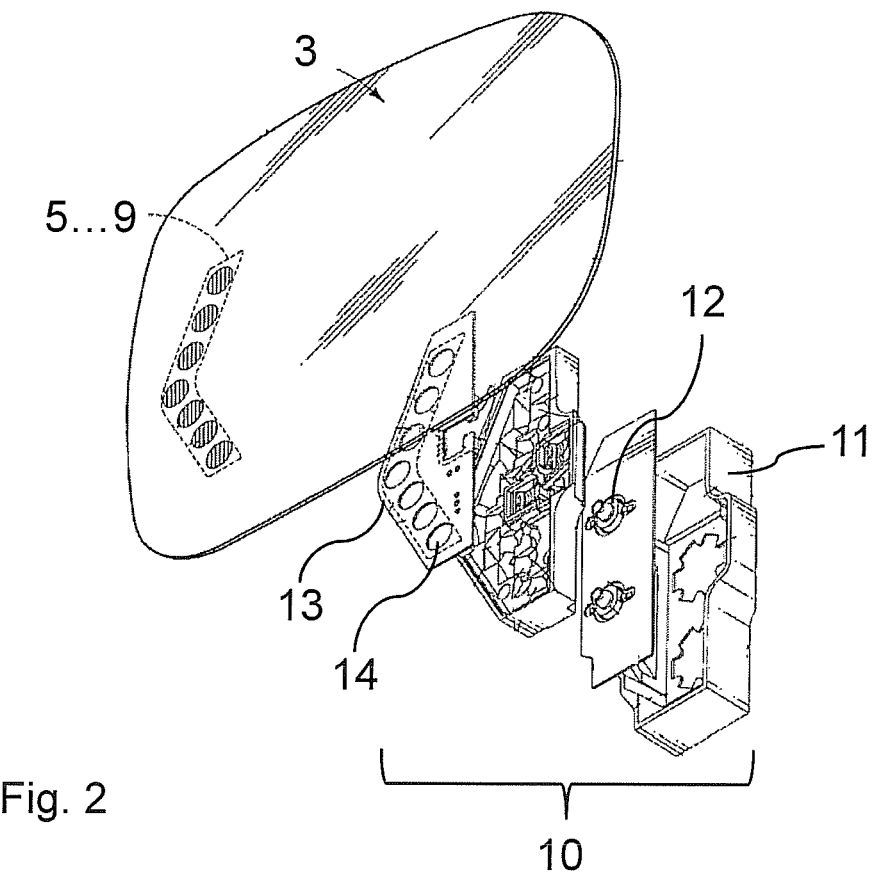

FIG. 2 shows an exploded drawing of the exterior mirror shown in FIG. 1, with a light module according to the prior art. The display icons 5 to 9 to be shown can be seen on the left on the mirror glass 3 as a gap in the reflective layer.

The actual light module 10 comprises a housing with luminous elements 12, which is covered by a masking layer 13. The masking layer 13 comprises recesses 14, which correspond to the icons to be shown. Light modules of this type are provided with an adhesive layer 13 and stuck to the rear side of the mirror glass 3.

In contrast, the invention takes a different approach. In a first embodiment, the light module according to the invention comprises a transparent cover plate, through which light is fully transmitted. The transparent cover plate seals the housing 11 and backlights the icons, which are to be displayed. The light module has no masking function.

The icons to be shown are placed directly on the mirror. For this, the mirror glass 3 is conventionally metallised with a metallic layer, such as a layer 30 of chrome, titanium or aluminium; specific mirror layers or dielectric layers are not necessary.

The mirror glass is covered after coating with a coloured lacquer or a coloured layer of plastic 31. On one hand, the coating 31 serves in production for avoiding breakages of the mirror, when the mirror glasses are assembled. On the other hand, this coloured, preferably black, lacquer layer 31 serves to prevent possible reflections from the rear side of the mirror glass and to prevent residual transparency.

Aspherical glasses are permitted for vehicles in the EU. This concerns convex vaulted glasses with an aspherical additional area, which comprises variable radii. This additional region must be marked with a boundary line for approval of the glasses according to the European guidelines.

For this purpose, the rear sides of the mirror glass are already structured with a laser. Since this production step is already intended in the production of the exterior mirror, it is advantageous to produce the icon, which is to be displayed, in the same step.

The icon, which is to be displayed, is inscribed into the lacquer layer with a laser. For this purpose, the lacquer layer is selectively removed. Partial removal of the mirror layer 30 is also possible here. The reflective layer is maintained in part to give a diffuse light phenomenon. Some nanometers of the metallic layers are sufficient for this purpose.

In a further embodiment, the lacquer layer and the reflective material are completely removed from the rear side of the mirror glass.

Figure 3:
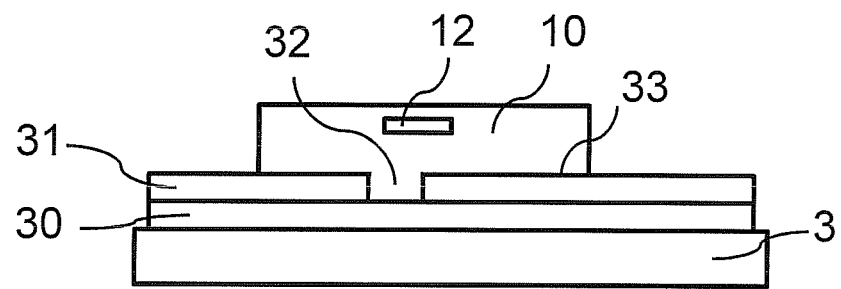
FIG. 3 shows a cut through the mirror and light module.

In the embodiment shown in FIG. 3, the light module 10 is not sealed by a cover plate 13, but rather is directly stuck or clamped onto the rear side of the mirror. The front sides of the housing are used for this purpose. If necessary, these front surfaces have to be widened, in order to obtain more adhesive surface. In the process, the light module contains only the electrical connections of the LED 12, and a housing 11, which is flush with the lens. All types of fastening, which an expert would allow for fastening the module, are permitted. In the process, the light module 10 covers a surface 33 of the rear side of the mirror glass. The coloured layer 31 is already structured in surface 33. The structure 32 is created with a laser beam, which ablates the icon from the layer. In the process, icons are warning signs, or ISO standard representations for indicating danger, as well as individual displays specific to the client. The advantage of the invention consists in that the light module does not have to be fixed precisely over the icon. The assembly of the light module is therefore made easier. If enough light is available, the icon will be sufficiently illuminated.

The sufficient illumination can necessitate further measures in the light module, such as reflectors, or optics. The number of luminous elements used and their type is dependent on the application. In the simplest case, one luminous element is sufficient.

Instead of the application in connection with a blind spot detection system, corresponding display concepts are used in connection with other functions, for example, parking assistance, etc. This applies for all of the functions, from which it can be assumed that the driver is looking in one of the mirrors of the vehicle for monitoring the rearward region of the vehicle. According to the design, the display is used in a suitable selection of the available mirrors or in all available mirrors at the same time.

The invention claimed is:

1. A display in a vehicle exterior mirror with a mirror glass, which is illuminated from its rear side with luminous display elements, whereby the mirror glass comprises on its rear side a metallic layer and the metallic layer is covered with a colored layer of plastic, whereby a light module, which consists of a housing and at least one light element, is affixed directly to and oriented with the rear side of the mirror glass, wherein at least the colored layer in the region of the light module being removed in the form of at least one icon, wherein the at least one icon being inscribed at least into the colored layer, by selective removal of a portion of the colored layer from the rear side of the mirror glass with a laser beam.

2. Display according to claim 1, characterized in that the metallic mirror layer is partly removed.

3. Display according to claim 1, characterized in that the light module comprises a cover lens.

4. Display according to claim 1, characterized in that the light module covers a region of the mirror glass.

5. Display according to claim 1, characterized in that the light module comprises reflectors and/or optics.

6. Display according to claim 1, characterized in that the light module is stuck to the rear side of the mirror glass with the front sides of the housing.

7. Display according to claim 3, characterized in that the light module is completely stuck down by the cover lens.

8. A method for fabricating a display for use in a vehicle exterior mirror with a mirror glass, the method comprising the steps of:
   coating a surface of the mirror glass with a reflective layer;
   applying a colored layer of plastic over the reflective layer;
   selectively removing a portion of the colored layer of plastic to form an icon; and
   affixing a light module directly to the colored layer of plastic and the mirror glass such that the light module is aligned with the icon and emits light out therefrom and that passes the icon and the through the mirror glass.

9. A method as set forth in claim 8 wherein the step of selectively removing a portion of the colored layer of plastic includes the step of etching the colored layer with of plastic with a laser.

10. A method as set forth in claim 9 including the step of etching a portion of the reflective layer away when etching the portion of the colored layer of plastic away to form a diffuser to diffuse the light as it passes through the mirror glass.

* * * * *